(12) United States Patent
Wu et al.

(10) Patent No.: US 10,970,198 B2
(45) Date of Patent: Apr. 6, 2021

(54) AUTOMATIC TEST SYSTEM AND METHOD THEREOF

(71) Applicants: Inventec (Pudong) Technology Corporation, Shanghai (CN); INVENTEC CORPORATION, Taipei (TW)

(72) Inventors: Qun Wu, Shanghai (CN); Xuefeng Chen, Shanghai (CN); Dong-Rui Xue, Shanghai (CN)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 18 days.

(21) Appl. No.: 16/541,333

(22) Filed: Aug. 15, 2019

(65) Prior Publication Data

US 2020/0409828 A1 Dec. 31, 2020

(30) Foreign Application Priority Data

Jun. 26, 2019 (CN) .......................... 201910562301.6

(51) Int. Cl.
*G06F 11/36* (2006.01)
*G06F 11/30* (2006.01)
*G06F 11/34* (2006.01)

(52) U.S. Cl.
CPC ...... *G06F 11/3688* (2013.01); *G06F 11/3062* (2013.01); *G06F 11/3476* (2013.01); *G06F 11/3684* (2013.01)

(58) Field of Classification Search
CPC ............. G06F 11/3688; G06F 11/3062; G06F 11/3476; G06F 11/3684

(Continued)

(56) References Cited

U.S. PATENT DOCUMENTS

2003/0014738 A1* 1/2003 Dawkins ............... G06F 11/362
717/131
2005/0125188 A1* 6/2005 Eden ................... G06F 11/3688
702/121

(Continued)

OTHER PUBLICATIONS

Kesav, O. Homa, and B. Abdul Rahim. "Automated Wireless Meter Reading System for Monitoring and Controlling Power Consumption." International Journal of Recent Technology and Engineering 1.2 (2012): pp. 957-962. (Year: 2012).*

(Continued)

*Primary Examiner* — Satish Rampuria
(74) *Attorney, Agent, or Firm* — Locke Lord LLP; Tim Tingkang Xia, Esq.

(57) ABSTRACT

An automatic test system suitable for testing a server comprises a storage device, a computing device, and a sensing device. The storage device stores an automatic test script. The sensing device collects a plurality of test results of the server. The automatic test script comprises a parameter configuration module, a data processing module, and a core logic module. The parameter configuration module provides a plurality of configuration parameters associated with a server test procedure. The data processing module comprises a data recording sub-module and a data sorting sub-module, while the former receives an output data set from the server test procedure, and the latter generates a test report according to the output data set and the configuration parameters. The core logic module comprises a plurality of instruction sets for controlling the server test procedure through a data exchange interface.

6 Claims, 2 Drawing Sheets

(58) Field of Classification Search
USPC .................................................. 717/124–139
See application file for complete search history.

(56) References Cited

U.S. PATENT DOCUMENTS

| | | | |
|---|---|---|---|
| 2008/0127065 A1* | 5/2008 | Bryant | G05B 19/056 717/109 |
| 2014/0164841 A1* | 6/2014 | Corfield | G06F 11/3688 714/38.1 |
| 2014/0282433 A1* | 9/2014 | Eilam | G06F 11/3676 717/131 |

OTHER PUBLICATIONS

Versick, Daniel, Ingolf Waßmann, and Djamshid Tavangarian. "Power consumption estimation of CPU and peripheral components in virtual machines." ACM SIGAPP Applied Computing Review 13.3 (2013): pp. 17-25. (Year: 2013).*

Moore, Justin, Jeffrey S. Chase, and Parthasarathy Ranganathan. "Weatherman: Automated, online and predictive thermal mapping and management for data centers." 2006 IEEE international conference on Autonomic Computing. IEEE, 2006.pp. 155-164 (Year: 2006).*

Morein, William G., et al. "Using graphic turing tests to counter automated ddos attacks against web servers." Proceedings of the 10th ACM conference on Computer and communications security. 2003.pp. 8-19 (Year: 2003).*

Milani Fard, Amin, Mehdi Mirzaaghaei, and Ali Mesbah. "Leveraging existing tests in automated test generation for web applications ." Proceedings of the 29th ACM/IEEE international conference on Automated software engineering. 2014.pp. 67-78 (Year: 2014).*

Chu, Huey-Der. "A blackboard-based decision support framework for testing client/server applications." 2012 Third World Congress on Software Engineering. IEEE, 2012.pp. 131-135 (Year: 2012).*

* cited by examiner

AUTOMATIC TEST SYSTEM AND METHOD THEREOF

CROSS-REFERENCE TO RELATED APPLICATIONS

This non-provisional application claims priority under 35 U.S.C. § 119(a) on Patent Application No(s). 201910562301.6 filed in China on Jun. 26, 2019, the entire contents of which are hereby incorporated by reference.

BACKGROUND

1. Technical Field

The disclosure relates to a test system and a method thereof, more particularly to an automatic test system and an automatic test method adapted to a field of server dissipation.

2. Related Art

The government and the industrial community pay more attention to the power consumption of a server since there are more and more large data centers are built. To perform a fair evaluation of the servers of each brand, SPECpower_ssj2008 is proposed as an industrial standard for calculating the power consumption and the performance of the server. The development of the SPECpower_ssj2008 test standard provides an objective benchmark testing manner that helps IT equipment managers realize the power consumption characteristics of each server in the apparatus room, thereby improving the operating efficiency of the data center. In other words, the SPECpower_ssj2008 test standard allows the comparability of products between various server manufacturers due to differences in workload, system configuration, and test environment.

In general, the test of SPECpower_ssj2008 needs to construct a test platform, which comprises a server under test, a test control system, a power analyzer, and a temperature sensor. The test control system mainly adjusts the load of the server under test and records the test data. The power analyzer provides power to the server under test and records the relevant power consumption data. The temperature sensor records the temperature of the server under test at different load levels. Regarding the basic test flow, for example, the test control system issues a request with different load levels for a while according to the CPU load of the server under test from 10% to 100%, and every 10% is an interval of the test level. The average of ssj_ops data and power consumption data is recorded. After the full data is recorded, the sum of ssj_ops is divided by the sum of power consumption and the quotient is served as the final SPECpower_ssj2008 indicator.

However, in practice, the SPECpower_ssj2008 test is a complicated and time-consuming task. In addition, various configuration parameters need to be set during the testing process, which is a complicated and tiring job, and the data sorting process of the test data is also quite complicated. Therefore, if the tester's experience is not enough, it is quite easy to make mistakes in the process of repeated tests, and it is difficult to find the wrong place. This increases the labor and time costs of testing. On the other hand, engineers in the field of heat dissipation often lack software development capabilities, and the variable test content makes the development of dedicated test software costly but the benefits are low. Therefore, there is an urgent need for a system and a method that can be used in the field of heat dissipation testing.

SUMMARY

According to one or more embodiment of this disclosure, an automatic test system adapted to test a server comprising: a storage device configured to store an automatic test script, wherein the automatic test script comprises: a parameter configuration module configured to provide a plurality of configuration parameters, the plurality of configuration parameters is associated with a server test procedure; a data processing module comprising a data recording sub-module and a data sorting sub-module, wherein the data recording sub-module is configured to receive an output data set from the server test procedure, and the data sorting sub-module is configured to generate a test report according to the output data set and the plurality of configuration parameters; and a core logic module comprising a plurality of instruction sets, wherein the plurality of instruction sets is configured to control the server test procedure through the data exchange interface; a computing device communicatively connecting to the storage device, wherein the computing device is configured to execute the server test procedure on the server according to the automatic test script; and a sensing device communicatively connecting to the storage device and the computing device, wherein the sensing device is configured to collect a plurality of test results of the server; wherein, the computing device which operates the server test procedure is further configured to convert the plurality of test results into the output data set.

According to one or more embodiment of this disclosure, an automatic test method adapted to an automatic test system performing a test to a server, with the method comprising: setting at least one of a plurality of configuration parameters by a parameter configuration module of the automatic test system, wherein said at least one of the plurality of configuration parameters is associated with a server test procedure; selectively receiving and storing a customized code by a data processing module of the automatic test system; executing at least one of a plurality of instruction sets by a core logic module of the automatic test system through a data exchange interface to control the server test procedure; and after the server test procedure is finished, receiving an output data set from the data exchange interface by a data recording sub-module of the data processing module, generating a test report by a data sorting sub-module of the data processing module according to the output data set and the plurality of configuration parameters.

As described above, the automatic test system and the automatic test method proposed in the present disclosure may simplify the test progress, reduce the error rate, save test time and manpower. Moreover, in the automatic test system proposed in the present disclosure, the automatic test script located in the storage device has a clear structure and is easy to maintain, customize and upgrade.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
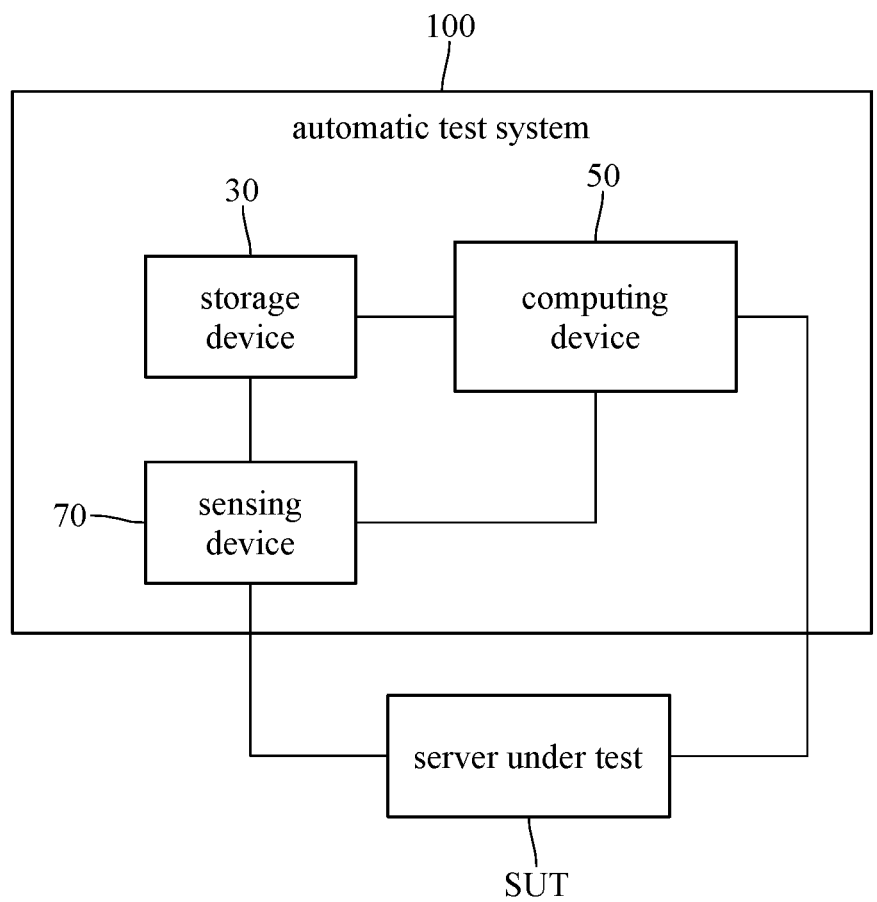
FIG. 1 is a block diagram of the automatic test system according to an embodiment of the present disclosure.

Please refer to FIG. 1, which illustrates a block diagram of the automatic test system 100 according to an embodiment of the present disclosure. As shown in FIG. 1, the automatic test system 100 is adapted to test a server under test SUT. The automatic test system 100 comprises a storage device 30, a computing device 50, and a sensing device 70. The computing device 50 communicatively connects to the storage device 30, the sensing device 70 communicatively connects to the storage device 30 and the computing device 50.

Please refer to FIG. 1, which illustrates a block diagram of the automatic test system 100 according to an embodiment of the present disclosure. As shown in FIG. 1, the automatic test system 100 is adapted to test a server under test SUT. The automatic test system 100 comprises a storage device 30, a computing device 50, and a sensing device 70. The computing device 50 communicatively connects to the storage device 30, the sensing device 70 communicatively connects to the storage device 30 and the computing device 50.

The storage device 30 stores an automatic test script. The computing device 50 performs a server test procedure on the server under test SUT according to the automatic test script. The server test procedure is, for example, SPECpower_ssj2008, but this is not a limitation of the present disclosure. SPECpower_ssj2008 is a software developed by SPECpower Committee. SPECpower_ssj2008 is mainly used to evaluate the server's performance. In the heat dissipation area, this software applies loadings of different percentages to the server and analyzes the heat dissipation condition of the server under the loading of each percentage. The sensing device 70 collects a plurality of test results of the server under test SUT, and then the computing device 50 running the server test procedure converts these test results into the output data set. Practically, the sensing device 70 is, for example, a power analyzer providing a power source to the server under test SUT or a temperature sensor. The present disclosure does not limit the type of sensing device 70.

Practically, the automatic test script and the server test procedure can be integrated into an installation file, such manner may avoid unpredictable errors due to the configuration problems of the server test procedure.

The automatic test script comprises a parameter configuration module, a data processing module, and a core logic module. The functions of these modules will be described below.

The parameter configuration module is configured to provide a plurality of configuration parameters. These configuration parameters are associated with the server test procedure. Practically, these configuration parameters comprise an installation path of the server test procedure, a time interval collecting log files, an outputting path of log files, a prefix filename of log files, a starting percentage and an ending percentage of the circular test, and a circular increase. An ordinary tester may start a new test by modifying core configuration parameters enumerated in the parameter configuration module of the automatic test script.

The data processing module comprises a data recording sub-module and a data sorting sub-module. The data recording sub-module, for example, comprises a function recording the SDR data, a function recording the CPU information, a function recording the PCI information, and the present disclosure does not limit thereto. The data recording sub-module receives an output data set from the aforementioned server test procedure. The data sorting sub-module generates a test report according to the output data set and the configuration parameters. The data sorting sub-module is, for example, a function dedicated to data typesetting, and a function dedicated to processing the log file. The test report shows test results such as a fan working period, a server power consumption, a processor power consumption, a Dual In-line Memory Module (DIMM) power consumption, a fan rotating speed, an environment temperature, a DIMM temperature and a processor temperature in a tabular form. An advanced tester may change the form of typesetting by modifying the code or function of the data sorting sub-module or add a customized data reading function and typesetting function.

The core logic module communicatively connects to the parameter configuration module, data processing module and a data exchange interface of the server test procedure. The core logic module comprises a plurality of instruction sets. These instruction sets are configured to control the server test procedure through the data exchange interface. One of these instruction sets is a stress test instruction set. The core logic module calculates a number of execution times according to the starting percentage, the ending percentage, and the circular increase, uses the computing device 50 repeatedly execute the server test procedure according to the stress test instruction set and the number of execution time to obtain an evaluation result of the server under test SUT under the stressing test whose loading increases every time. Then, the data processing module receives the evaluation score generated by the server test procedure running the stress test instruction set, divides the evaluation score by the number of CPU cores and fill the quotient into the configuration file (such as SPECpower_ssj_EXPERT.props) of the server test procedure. For a professional tester, he may write the instruction set on his own, thereby controlling the server test procedure to perform the test according to the operating flow of the instruction set.

Figure 2:
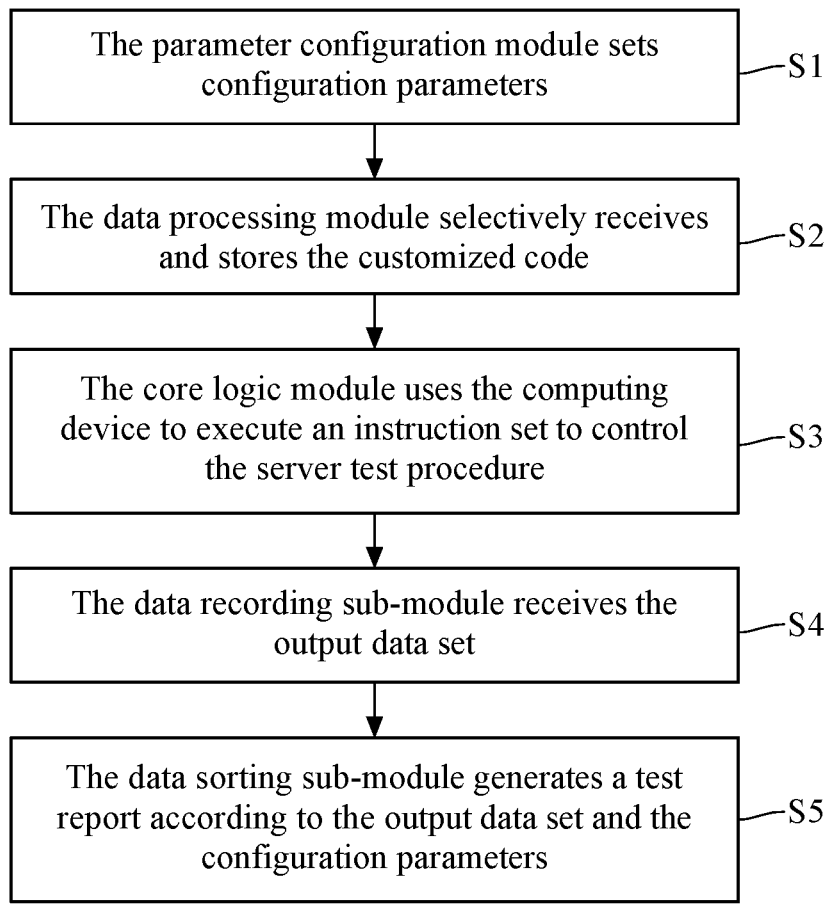
FIG. 2 is a flowchart of the automatic test method according to an embodiment of the present disclosure.

Please refer to FIG. 2, which illustrates a flowchart of an automatic test method according to an embodiment of the present disclosure. The automatic test method is adapted to the automatic test system 100, which performs a test to a server under test SUT.

Please refer to step S1. The parameter configuration module sets configuration parameters. Specifically, the parameter configuration module of the automatic test system 100 is used to set at least one of the plurality of configuration parameters, wherein the configuration parameters are associated with a server test procedure.

Please refer to step S2. The data processing module selectively receives and stores the customized code.

Please refer to step S3. The core logic module uses the computing device 50 to execute an instruction set to control the server test procedure. Specifically, the core logic module of the automatic test system 100 executes at least one of the plurality of instruction sets through a data exchange interface to control the server test procedure. Practically, the core logic module activates the procedure in this step S3, and then the loading cycle is activated.

Please refer to step S4. The data recording sub-module receives the output data set. Specifically, after the server test procedure finishes the execution, the data recording sub-module of the data processing module receives the output data set through the data exchange interface. Practically, this step S4 receives data after the end of each load cycle.

Please refer to step S5. The data sorting sub-module generates a test report according to the output data set and the configuration parameters. Practically, in step S5, after receiving the data, the processing function of the data sorting sub-module is invoked to perform data processing.

In view of the above, the automatic test system and the automatic test method proposed in the present disclosure may simplify the testing progress, reduce the error probability, and saves the testing time and manpower. Moreover, the automatic test script in the storage device of the automatic test system of the present disclosure has a clear structure and is easy to maintain, customize, and upgrade. The architecture adopting the automatic test script of the present disclosure may be quickly duplicated and simply modified to obtain other testing tasks in the field of server hear dissipation. Therefore, it is possible for a developer to develop a new automatic test script by himself using the architecture of the automatic test script of the present disclosure.

In view of the real test condition, the traditional test method takes about 7.5 hours (comprising 80 minutes for the evaluation, 220 minutes for the stress test, 30 minutes for calculating and modifying the configuration parameters, and 120 minutes, for sorting the data, and the total is 450 minutes). The automatic test system and method according to the present disclosure may save the time required to calculate and modify the configuration parameters and sort the data, so it takes only about 5 hours. Furthermore, in comparison with the traditional test method, the automatic test system and method proposed in the present disclosure do not require human intervention throughout the testing progress, thus saving labor costs.

What is claimed is:

1. An automatic test system adapted to test a server, comprising:
    a storage device configured to store an automatic test script, wherein the automatic test script comprises:
        a parameter configuration module is to provide a plurality of configuration parameters, the plurality of configuration parameters is associated with a server test procedure;
        a data processing module comprising a data recording sub-module and a data sorting sub-module, wherein the data recording sub-module is to receive an output data set from the server test procedure, and the data sorting sub-module is to generate a test report according to the output data set and the plurality of configuration parameters; and
        a core logic module comprising a plurality of instruction sets, wherein the plurality of instruction sets is to control the server test procedure through a data exchange interface;
    a computing device communicatively connecting to the storage device, wherein the computing device is configured to execute the server test procedure on the server according to the automatic test script; and
    a sensing device communicatively connecting to the storage device and the computing device, wherein the sensing device is configured to collect a plurality of test results of the server;
    wherein the computing device operating the server test procedure is further configured to convert the plurality of test results into the output data set;
    wherein the plurality of configuration parameters comprises an installation path, a time interval, an outputting path of a log file, a prefix file name of the log file, a starting percentage, an ending percentage, and a circular increase;
    wherein one of the plurality of instruction sets is a stress test instruction set, and the core logic module further calculates a number of executions according to the starting percentage, the ending percentage, and the circular increase, and repeatedly executes the server test procedure according to the stress test instruction set and the number of executions.

2. The automatic test system of claim 1, wherein the data processing module further receives an evaluation score generated by the server test procedure during an execution of the stress test instruction set.

3. The automatic test system of claim 1, wherein the test report shows a fan working period, a server power consumption, a processor power consumption, a Dual In-line Memory Module (DIMM) power consumption, a fan rotating speed, an environment temperature, a DIMM temperature, and a processor temperature in a tabular form.

4. An automatic test method adapted to an automatic test system performing a test to a server, with the method comprising:
    setting at least one of a plurality of configuration parameters by a parameter configuration module of the automatic test system, wherein said at least one of the plurality of configuration parameters is associated with a server test procedure;
    selectively receiving and storing a customized code by a data processing module of the automatic test system;
    executing at least one of a plurality of instruction sets by a core logic module of the automatic test system through a data exchange interface to control the server test procedure; and
    after the server test procedure is finished, receiving an output data set from the data exchange interface by a data recording sub-module of the data processing module, generating a test report by a data sorting sub-module of the data processing module according to the output data set and the plurality of configuration parameters;
    wherein the plurality of configuration parameters comprises an installation path, a time interval, an outputting path of a log file, a prefix file name of the log file, a starting percentage, an ending percentage, and a circular increase;
    wherein one of the plurality of instruction sets is a stress test instruction set, and the core logic module further calculates a number of executions according to the starting percentage, the ending percentage, and the circular increase, and repeatedly executes the server test procedure according to the stress test instruction set and the number of executions.

5. The automatic test method of claim 4, wherein the output data set further comprises an evaluation score received from the data exchange interface during an execution of the stress test instruction set.

6. The automatic test method of claim 4, wherein the test report shows a fan working period, a server power consumption, a processor power consumption, a Dual In-line Memory Module (DIMM) power consumption, a fan rotating speed, an environment temperature, a DIMM temperature and a processor temperature in a tabular form.

\* \* \* \* \*